United States Patent
Lindenthal et al.

(10) Patent No.: US 6,722,787 B2
(45) Date of Patent: Apr. 20, 2004

(54) THRUST RING AND METHOD FOR PRODUCING A THRUST RING, BEARING SYSTEM FOR BOLTS OF UNIVERSAL JOINTS AND CARDAN JOINT ARRANGEMENT

(75) Inventors: Hans Lindenthal, Heidenheim (DE); Hans Rösle, Heidenheim (DE); Peter Grawenhof, Dettingen (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 09/894,770

(22) Filed: Jun. 28, 2001

(65) Prior Publication Data

US 2002/0001425 A1 Jan. 3, 2002

(30) Foreign Application Priority Data

Jun. 28, 2000 (DE) .......................................... 100 30 534

(51) Int. Cl.$^7$ .............................................. F16H 25/12
(52) U.S. Cl. ........................... 384/622; 384/590; 74/56
(58) Field of Search .............................. 74/56, 53, 567; 384/590, 609, 615, 618, 622

(56) References Cited

U.S. PATENT DOCUMENTS

| | | | | |
|---|---|---|---|---|
| 1,376,309 A | * | 4/1921 | Armstrong ................. | 384/590 |
| 2,567,576 A | * | 9/1951 | Palumbo ....................... | 74/56 |
| 3,443,446 A | * | 5/1969 | Buergel ........................ | 74/56 |
| 4,756,239 A | * | 7/1988 | Hattori et al. .............. | 74/56 X |
| 5,452,647 A | * | 9/1995 | Murakami et al. ............. | 74/56 |

* cited by examiner

Primary Examiner—David A. Bucci
Assistant Examiner—Colby Hansen
(74) Attorney, Agent, or Firm—Ostrolenk, Faber, Gerb & Soffen, LLP

(57) ABSTRACT

A thrust ring, in particular an axial bearing thrust ring, for forming a running surface for rolling elements, for use in bearing systems for universal joints of cardan shafts. The ring has a first planar end side and a second end side, having two surface regions on the second end side which have been machined symmetrically with respect to a first axis of symmetry $S_D$ of the thrust ring, and also in terms of its profile in the circumferential direction as seen starting from the first axis of symmetry, in the circumferential direction, to a further, second axis of symmetry $S_{SD}$ which runs at right angles to the first axis of symmetry $S_D$. Each of the surface regions can be described by a change in cross section of the thrust ring, which change comprises a reduction in the thickness dimensions describing the cross-sectional area in the region of the inner circumference and the outer circumference of the thrust ring, wherein the reduction in the thickness dimensions in the region of the inner circumference being less than in the region of the outer circumference.

13 Claims, 5 Drawing Sheets

| | a | b |
|---|---|---|
| I | 0.68 | 0.80 |
| II | 0.55 | 0.64 |
| III | 0.29 | 0.32 |
| IV | 0.02 | 0.01 |
| V | 0 | 0 |

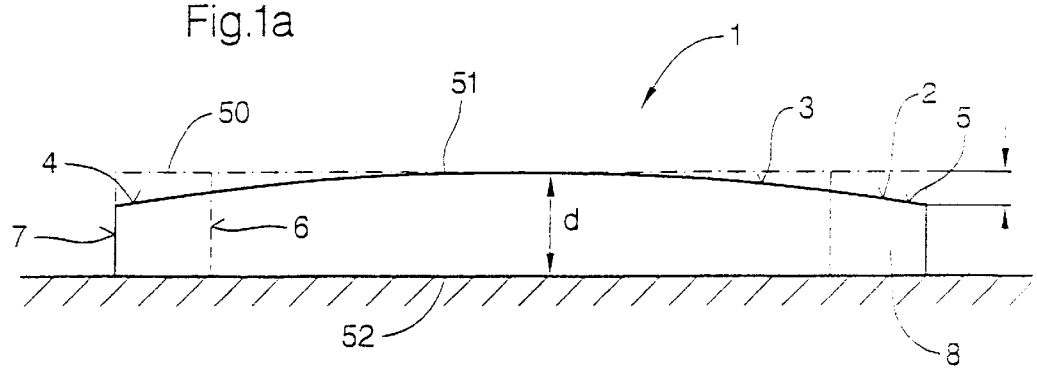
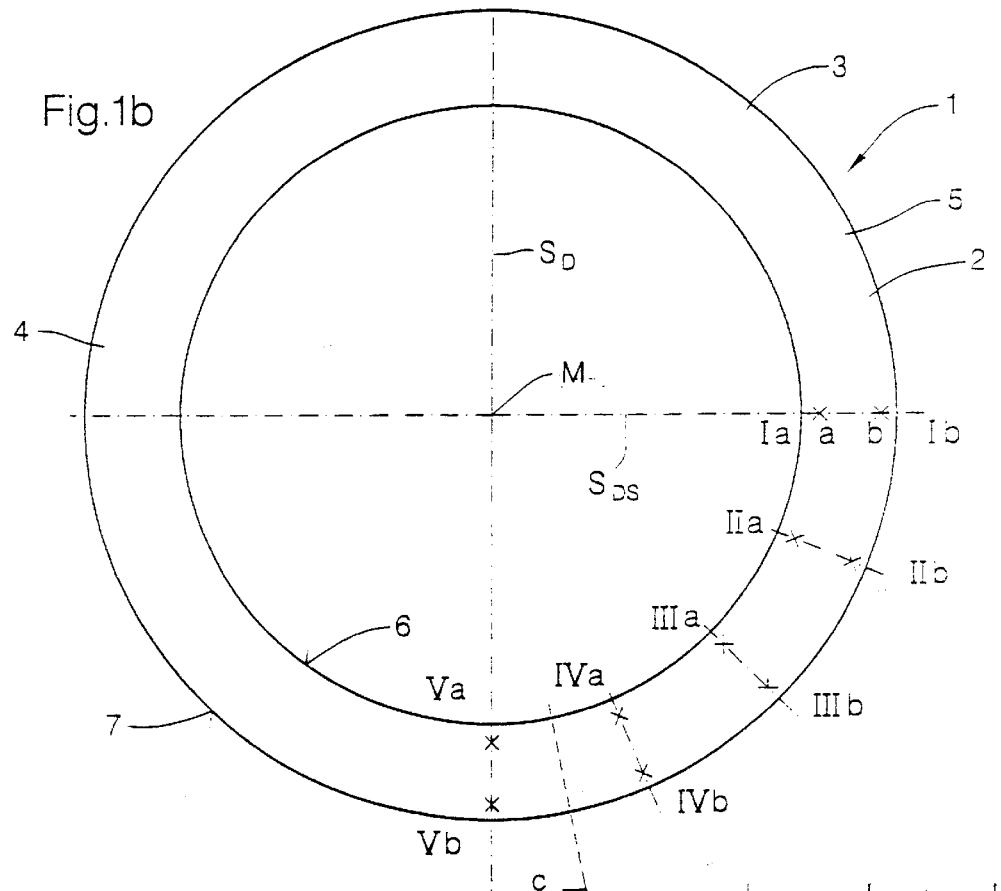

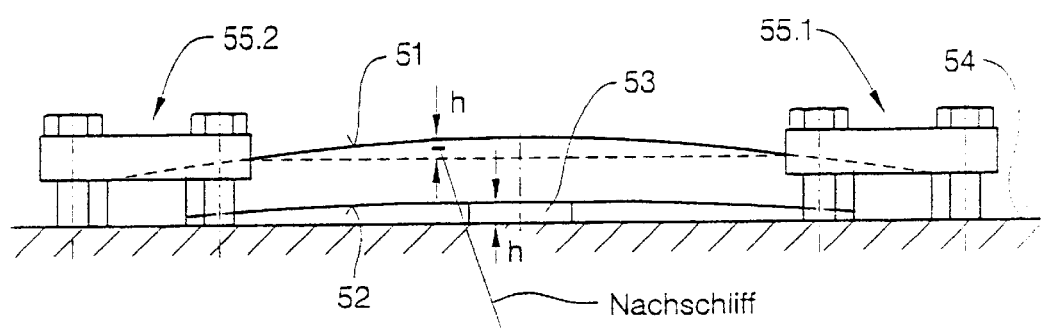
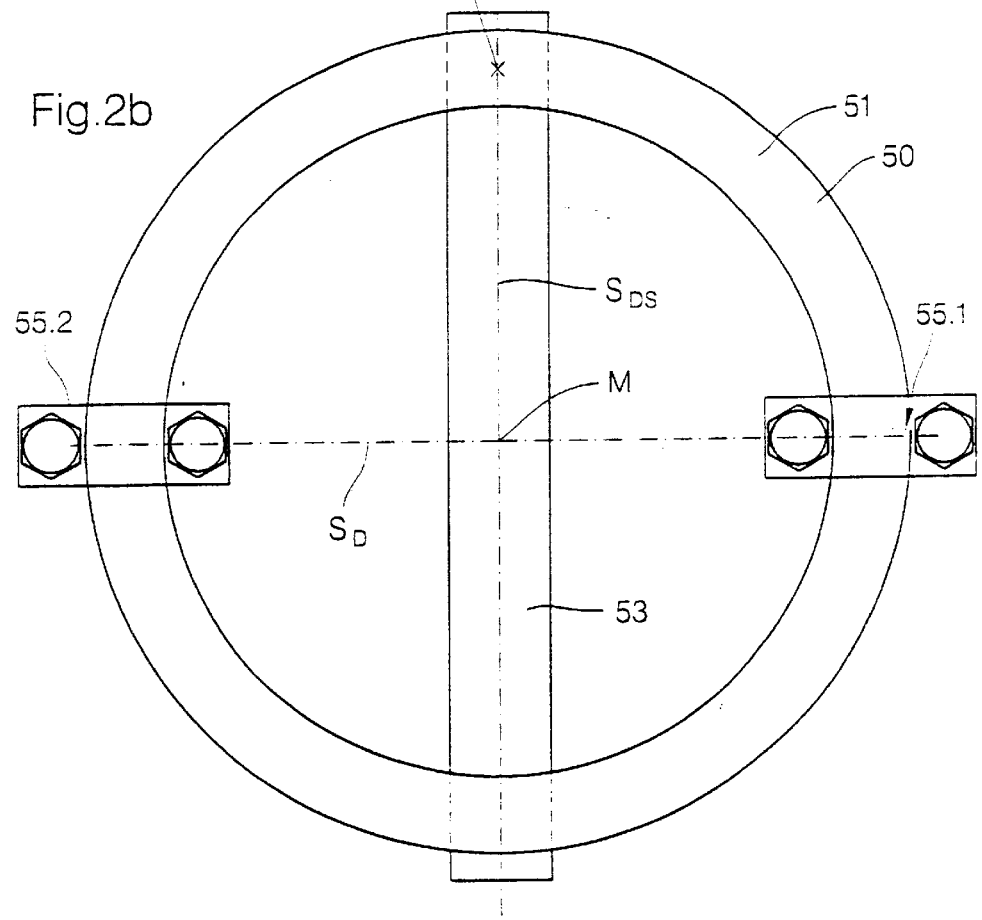

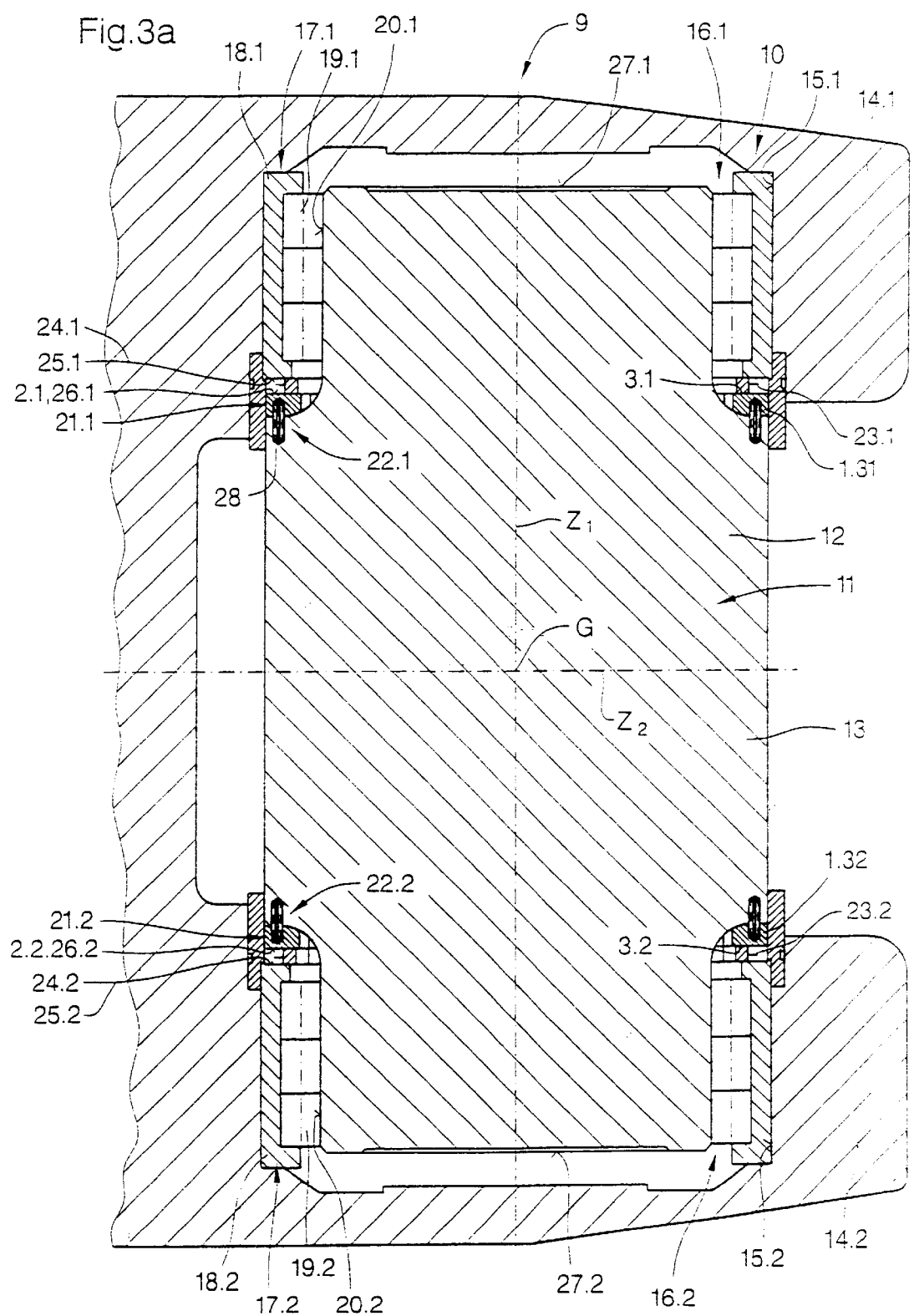

THRUST RING AND METHOD FOR PRODUCING A THRUST RING, BEARING SYSTEM FOR BOLTS OF UNIVERSAL JOINTS AND CARDAN JOINT ARRANGEMENT

BACKGROUND OF THE INVENTION

The invention relates to a thrust ring for use in bearing systems for bolts of a universal joint for use in cardan shafts and to a method for producing a thrust ring. It also relates to a bearing system for bearing a bolt of a universal joint in a bearing bore of an articulated yoke for use in cardan shafts. Finally, it relates to a cardan joint arrangement having a bearing system of this type.

Cardan joint arrangements, in particular the bearing systems for bearing bolts of a universal joint in articulated yokes for use in cardan shafts, are known in a wide variety of designs for a multiplicity of possible uses. To represent this prior art, reference is made to a publication Voith Forschung und Konstruktion [Voith Research and Design], Vol. 33 (1998), Article 10 "Entwicklung wälzgelagerter Gelenkwellen für die Hauptantriebe schwerer Walzgerüste" [Development of cardan shafts mounted on rolling bearings for the principal drives of heavy rolling stands], and to Voith-Druck G 1135, 11.91. These documents disclose designs of cardan joint arrangements for cardan shafts which comprise at least one universal joint which is mounted in at least one articulated yoke. The articulated yoke itself may be of single-part or two-part design. To attach the universal joint in the articulated yoke, a suitable bearing arrangement is provided for each individual bolt. The bearing arrangement comprises at least one radial bearing and an axial bearing. There are numerous possibilities for the arrangement of the axial bearing, although a suitable design of the individual elements of the bearing will emerge when account is taken of the deformation which occurs while the cardan shaft is operating. Article 10 from Voith Forschung und Konstruktion, Vol. 33, discloses a design with a radial/axial bearing in which the individual components of the bearing arrangement, the seals, the connection structure of the bearings and the flange connections which transmit the torque are carefully matched to one another with regard to stress distribution and deformation under load. In this design, the radial bearing comprises three rows of solid cylindrical rolls which are guided inside the inner ring. The radial bearing inner ring is supported, via a collar, on the bolt end sides. An outwardly facing collar at the other end of the ring forms the inner race of the axial bearing. In this design, the axial force is introduced via the bolt end side. In this arrangement, the materials of the individual elements are selected according to their different functions, i.e. high-strength heat-treated steel is selected for the drop-forged universal joint and rolled case-hardened steel is selected for the bearing sleeve. The problem of a bearing arrangement of this type is that the individual rolling bearings are exposed to high torque impacts and simultaneous transverse accelerations, in particular when used in rolling mill drives. The impact loads, with large and rapidly changing bending angles, cause elastic deformation of the articulated yokes both in the region of the flange and inside the yoke eye. The bore widens and generally adopts a non-circular shape.

However, the introduction of the peripheral force causes the most deformation at the universal joint. The direction of this force oscillates with the positive or negative value of the operating bending angle and also changes with each reversing operation. These operation-related and design-related influences result in alignment errors with an unfavorable introduction of loads into the bearing, namely a center offset of the yoke bore, a skew positioning of the bore, bending of the bolt and radial play in the rolling bearing and spring deflection of the rolling bearing. The result is an uneven radial pressure distribution in the bearing bore, resulting in the contact at the locations of contact of the rolling bodies of the radial bearing changing from linear to punctiform, and also leading to excessive edge stresses. The rolling bearing connection parts, universal joint and articulated yoke are therefore adapted to one another in terms of deformation travel. Since the axial bearings of heavy cardan joints are generally arranged in the region of the root of the bolt of the coupling, these influences which have been listed lead to tilting of the axial bearing races. In this context, the deformation of the bolt in the region of the root has the greatest influence, since this is where the curvature of the bending line related to the bending moment is greatest. This leads to high edge stresses in one segment of the axial bearing and to the rollers lifting off in the opposite segment, leading to a drastic reduction in the load-bearing capacity.

To allow a simple structural design of a radial/axial bearing unit of the cardan joint, therefore, the races of the bearing sleeve for both bearings have been centered and axially fixed over the lateral and end faces of the bolt. If the bolt then bends under a load, the bearing sleeve follows a tangent which touches the bending line of the end of the bolt. Therefore, plane parallelism is retained even when the universal joint is under load. A significant drawback of a design of this type, however, is that the design of the individual bearing element is relatively complicated and requires a large number of elements, in particular with regard to the design of the bearing cover. During the structural execution, and in particular designing, of the individual components, therefore, it is always necessary to take account of the deformation travel which may occur, so that it is impossible to provide a satisfactory design irrespective of knowledge of these influences.

In another solution for fitting the bearing arrangement known from EP 0 785 370 A1. In this arrangement, the inner ring of the radial bearing, in the fitted position, on the axially inner side, includes a collar which extends radially away from the axis of the bolt mounted in the articulated yoke. The term axial is understood as meaning a direction which runs substantially parallel to the axis of the bolt mounted in the articulated yoke, as seen from the joint axis. In this context, the term joint axis is understood as meaning the extended axis of the component connected to the articulated yoke. This axis extends through the intersection point, whether it is either direct or projected into a plane, of the bolt axes of the universal joint. The axes of the bolts, which are offset in each case by 90° with respect to one another, may lie in a common plane or may be offset with respect to one another in mutually parallel planes.

The collar of the inner ring of the radial bearing at least indirectly forms the axially outer running surface of the axial bearing. This means that the collar may on the one hand directly form the running surface for the rollers or the rolling elements of the axial bearing designed in some other way, or on the other hand it is also possible for the running surface of the axial bearing, i.e. the outer ring of the axial bearing, as seen in the fitted position on the bolt, to be supported on this collar. In the fitted position, the outer ring of the radial bearing has, in the axial direction, an inner collar which extends radially toward the axis of the bolt mounted in the articulated yoke. The collar of the outer ring of the radial bearing at least indirectly forms the axially inner running surface of the axial bearing. The outer ring also has a so-called axially outer collar, as seen in the fitted position, which is assigned a stop in the yoke eye. Furthermore, the inner ring is assigned an axially outer collar, as seen in the fitted position, which is directed toward the axis of the bolt mounted in the articulated yoke and forms an axial stop for seating the inner ring in the end-side region of the bolt. This outer collar can be connected in a positive and/or nonpositive manner to the bolt mounted in the articulated yoke. This collar may be designed in such a manner that it forms a structural unit with the inner ring.

Another possibility is for the collar to be formed by a separate component. This separate component may, for example, be in the form of a cover. The cover is preferably designed such that at least a first part of its cover inner surface, which is understood as meaning that cover surface which faces toward the joint axis in the fitted position, bears on the end side of the bolt mounted in the articulated yoke, while a second part of its cover inner surface, in the fitted position, forms a stop for the inner ring of the radial bearing. Contrary to the rigid bearing structure which is otherwise desired, this design produces elastic attachment of the axial bearing. Overall, this type of elastic attachment leads to improved bearing properties of the individual bearings of the bearing system and therefore to a longer service life of the bearing units and also of the universal joint arrangement as a whole. However, a significant drawback of a design of this type is that it entails a considerable design and manufacturing outlay, since attaching the bolts to the articulated yoke halves requires a large number of components which are responsible for the functions which have been described. Therefore, providing a bearing arrangement of this type is also very expensive, in view of the need to adapt the individual elements to one another and to adapt the associated tolerances which have to be observed.

Furthermore, particularly in cardan joint arrangements for heavy cardan shafts, in which the bearing bore of the articulated yoke may be of closed design, i.e. is designed as a blind bore, and in which as well as the axial bearing arrangement the sealing components are also to be arranged in the region of the bolt root, the known solutions entail considerable design and manufacturing outlay, since attaching the bolts to the articulate yoke halves requires a large number of components which are responsible for the functions which have already been described for other designs.

SUMMARY OF THE INVENTION

Therefore, the invention is based on the object of further developing a bearing system for cardan joint arrangements of the type described in the introduction, in particular for use in heavy cardan shafts, to avoid the above-mentioned drawbacks, i.e. so that this system has a simple structure and a small number of components. It should be possible to completely or at least nearly completely eliminate the negative influences on the bearing arrangement, in particular the axial bearing, during deformation of the torque-transmitting components without knowledge of the specific load situations in use, with a solution which is standardized as far as possible. The cardan joint arrangement, in particular the bearing system and its individual elements, are to be distinguished by low design and manufacturing outlay and low costs.

According to the invention, an annular basic element is ground to form a thrust ring for use in an axial bearing in a bearing arrangement for bearing a bolt of a universal joint in an articulated yoke or an articulated-yoke half so as to form a running surface for the rolling elements of the axial bearing. The axial bearing thrust ring is machined on its surface which forms the running surface in such a manner that this surface has at least two surface regions which are formed or machined symmetrically with respect to an axis which extends radially through the theoretical center point of the annular element, in particular is an axis of symmetry of the thrust ring. The individual surface region extends substantially from the region of the axis of symmetry in the circumferential direction of the thrust ring. The surface is machined in such a manner that the cross-sectional area of the thrust ring in the machined region decreases as seen starting from the region of the axis of symmetry toward a second radially directed axis of symmetry on a line which is perpendicular to the first axis of symmetry. The thickness or width in the height direction of the thrust ring decreases in each case as seen from the inner circumference toward the outer circumference. As well as a first planar end side, the thrust ring also comprises a second end side, which has two surface regions which have been machined substantially symmetrically with respect to the first axis of symmetry $S_D$ of the thrust ring. Deviations caused by tolerances within a specific range are possible and are also to be included in the scope of protection. When the thrust ring is viewed from above, the first axis of symmetry runs in the radial direction through the theoretical center point and divides the thrust ring theoretically into two symmetrical ring segments. In terms of its profile in the circumferential direction as seen starting from the first axis of symmetry $S_D$, in the circumferential direction, to a further, second axis of symmetry $S_{SD}$ which runs at right angles to the first axis of symmetry $S_D$, each of the symmetrically machined surface regions can be described by a change in cross section of the thrust ring, which change is characterized by reductions in the thickness dimensions describing the cross-sectional area in the region of the inner circumference and the outer circumference of the thrust ring. The reductions in the thickness dimensions in the region of the inner circumference is less than in the region of the outer circumference, so that the surface is inclined from the inner circumference toward the outer circumference. This inclination has a specific gradient.

When integrated into a bearing system for bearing a bolt in an articulated yoke, the invention allows easy play adjustment, even in the loaded state, in the event of tilting of the elements which form the axial bearing races by constantly ensuring that the rolling elements bear with surface-to-surface contact against the corresponding running surface of the axial bearing, thus ensuring good load-bearing properties.

With regard to the design and/or arrangement of the machined surface regions, there are a plurality of options, which may differ in terms of the extent of the machined region in the circumferential direction and the form of the machined region from the inner circumference to the outer circumference of the thrust ring. In the former case, it is possible for the machining, starting from the axis of symmetry, to be carried out on both sides in each case at a specific distance from the axis of symmetry, i.e. for in each case only a segmental region of the thrust ring on both sides of the first axis of symmetry to be machined, starting at a specific circumferential distance from the first axis of symmetry. A further possibility is for the machining to be started directly at the first axis of symmetry. However, this is dependent on the specific application and the prevailing loads in that application and therefore the play adjustment which it is necessary to implement and the associated magnitude of the continuous change in cross section which is required. To simplify production, the cross-sectional areas at the first axis of symmetry $S_D$ and in the region of this axis are preferably characterized by identical thickness dimensions between inner circumference and outer circumference inclusive, i.e. the end sides of the thrust ring are parallel to one another in the region of the first axis of symmetry.

The change in the cross section of the thrust ring caused by a reduction in the thickness dimensions which describe the cross-sectional area, in order to avoid edge pressures in the radial direction, takes place, starting from the theoretical center point when the thrust ring is viewed from above, preferably directly from the inner circumference to the outer circumference of the thrust ring.

The changes in the thickness dimensions, which describe the change in cross section of the thrust ring, compared to the thickness dimension at the first axis of symmetry $S_D$ are, for relatively small and medium-sized joints, in the range of tenths of a millimeter. However, this is substantially dependent on the level of forces which occur in the bearing system of the cardan joint arrangement and, in particular, the level of the peripheral force and therefore the tilting of those elements of the axial bearing which form the race for the rolling elements which occurs. For large joints and high torques which are to be transmitted, thickness differences of up to 2 mm inclusive may be necessary. By way of example, the changes in the thickness dimensions which describe the change in cross section of the thrust ring at the inner circumference, between the first axis of symmetry $S_D$ and the second axis of symmetry $S_{DS}$, which runs at right angles to the first axis of symmetry $S_D$, are between 0 and 0.68 mm, and at the outer circumference are between 0 and 0.8 mm for an axial bearing of a certain size. The amount of material removed in the machined surface regions changes proportionally to the size of the axial bearing.

With regard to the design of the cross-sectional area, there are also numerous possibilities. In the unmachined state on the annular basic element, in the circumferential direction, this area is preferably characterized by a square or rectangular cross section. Other designs are conceivable, although it is necessary to take into account that at least that part of the surface of the thrust ring which theoretically forms a running surface should have a planar surface. The machining may take place in such a manner that the abrasion is carried out from the inner circumference to the outer circumference or the grinding tool acts on the surface in such a manner that abrasion in the region of the line perpendicular to the axis of symmetry takes place starting at a specific distance from the inner circumference, i.e. although a planar surface which is slightly inclined is formed in the region of the abrasion, the latter solution is only suitable for end sides to be machined which have different thickness regions between inner circumference and outer circumference, provided that the thickness of the thickness regions on the inner circumference and on the outer circumference is smaller than between these circumferences. Otherwise, shoulders will be formed, causing edge stresses.

The thrust ring is easy to manufacture, the material used is preferably heat treated case-hardened steels or other steels with an elasticity in the range from 180,000 N/mm² to 230,000 N/mm² inclusive. To simplify machining, it preferably has, as an annular basic element in the unmachined state, a cross section which is uniform in the circumferential direction. To produce the machined surface regions, the annular basic element is secured on both sides, in the region of its first axis of symmetry, with respect to a base surface. An element of specific height, preferably a piece of flat steel which is arranged and aligned in the region of the line which is perpendicular to the first axis of symmetry, is uniformly fitted under the annular element beforehand. This means that the region which can be described by the line perpendicular to the axis of symmetry—always with respect to the clamping of the thrust ring in the clamping device—is enlarged. The annular basic element or the thrust ring is clamped in the region of the axis of symmetry with a specific, predefined force. This force is in turn dependent on the elasticity of the thrust ring and of the underfitted element and on the desired abrasion on that surface of the thrust ring which forms the running face, i.e. the surface regions which are to be machined. A grinding operation then takes place on both sides of the first axis of symmetry, the grinding tool being set for a specific amount of abrasion, and the difference in abrasion in the circumferential direction resulting only from the elastic deformation of the thrust ring. The abrasion in the circumferential direction of the thrust ring, as seen from above, and as seen in cross section from the inner circumference to the outer circumference of the thrust ring, is of different levels of magnitude. The grinding tool can act on the surface of the thrust ring in such a manner that the abrasion begins directly in the region of the axis of symmetry and extends over the region which can be described by the line which is perpendicular to the axis of symmetry on the thrust ring, in the circumferential direction, back toward the axis of symmetry. This means that the axis of symmetry can be used to divide the thrust ring into two theoretical ring segments, the perpendicular line further dividing the segments into two quadrants. The abrasion and therefore the machined surface regions on the surface of the thrust ring are configured in such a manner that they are formed symmetrically with respect to the first axis of symmetry. Therefore, a machined region extends substantially over a segment of the thrust ring which is in the form of half a ring.

In the most simple case, the device for machining the thrust ring comprises two clamping means which, in the region of the first axis of symmetry, secure the thrust ring with a specific, predefined force with respect to abase surface, and an underfitted means which is fitted beneath the thrust ring in the region of the line perpendicular to the axis of symmetry. In the most simple case, the clamping means may be screw connections, or alternatively a clamping device may be used.

The thrust ring for forming an axial bearing race may in this case be used in axial bearings for bearing systems for bearing universal joints in articulated yokes in cardan shafts of a very wide range of designs. Suitable designs of bearing systems are in particular those with a) the axial bearing arranged in the region of the bolt root, or b) the axial bearing arranged in the region of the end face of the bolt mounted in the articulated yoke, or c) the axial bearing arranged in a bolt bore provided in the region of the end face of the bolt.

In both cases, the thrust ring forms in each case one running surface for the rolling elements of the axial bearing. In the first case, the thrust ring, as seen from the joint axis G toward the end face of the bolt mounted in the articulated yoke, forms the inner running ring for the rolling elements of the axial bearing, while in the second case the thrust ring forms the outer race.

In order to actually ensure play adjustment, it is necessary for the machined surface regions to be positioned in a fitted position as seen in the direction of rotation of the universal joint. The thrust ring is positioned in such a manner that the cross section which has the greatest change in thickness lies in a plane which can be described by the axes of the bolts mounted in the articulated yokes. For this purpose, means for positioning the machined surface regions in the fitted position in the axial bearing are preferably provided, these means being intended to prevent twisting out of this position. The means comprise either at least one projection arranged on the outer circumference or one of the end faces, which projection, in the fitted state, interacts with a recess provided on an element which forms the bearing surround, or at least one recess which is arranged on one of the end faces and, in the fitted state, interacts with a projection arranged on an element which forms the bearing surround.

Other objects and features of the invention are explained below with reference to the drawings.

BRIEF DESCRIPTION OF THE DRAWINGS

FIGS. 1a and 1b are, respectively, side cross-sectional and top views illustrating one embodiment of a thrust ring which is designed in accordance with the invention;

FIG. 1c tabulates dimensions in an example of the ring of FIG. 1b;

FIGS. 2a and 2b show simplified views of a device for producing a thrust ring according to the invention;

FIG. 3a illustrates use of a thrust ring according to the invention in a bearing system for a cardan joint arrangement in an axial bearing, in the region of the bolt root;

DESCRIPTION OF PREFERRED EMBODIMENT

Figure 3B:
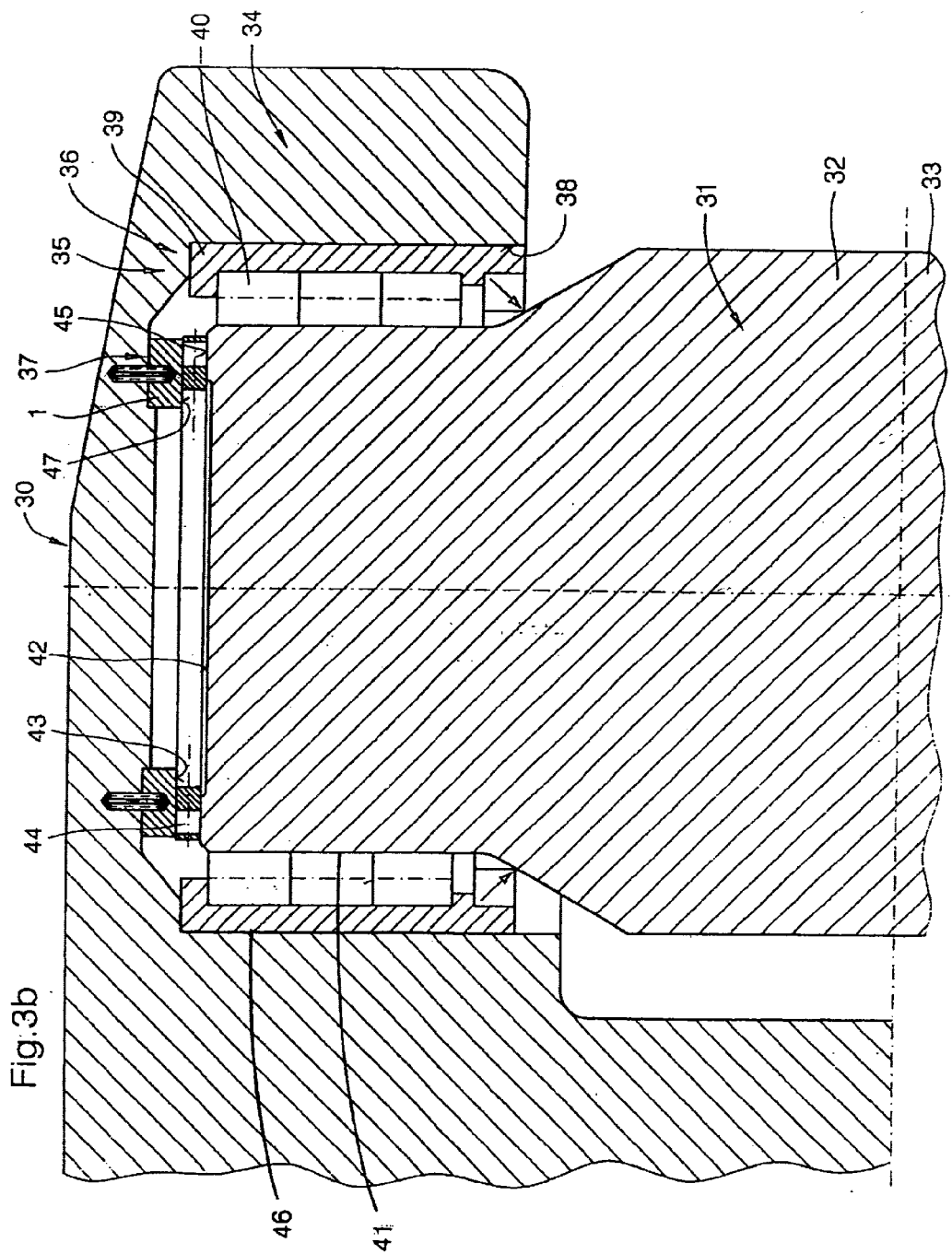
FIG. 3b illustrates use of a thrust ring according to the invention in a bearing system for a cardan joint arrangement in an axial bearing arranged in the region of the end face of the bolt.

FIGS. 1a and 1b illustrate an embodiment of a thrust ring 1 according to the invention which includes a running surface 2 for the rolling elements of an axial bearing arrangement for bearing a universal joint in an articulated yoke. In the fitted position, it is irrelevant whether the thrust ring, based on the joint axis, forms the outer running surface or the inner running surface of the rolling elements of the axial bearing. FIGS. 3a and 3b illustrate integration of the ring in a cardan joint arrangement.

FIG. 1a illustrates a view of the thrust ring 1 from the side, while FIG. 1b shows a view from above. FIG. 1a illustrates the thrust ring after machining, in particular after corrective grinding. The original annular basic body 50 from which the thrust ring 1 according to the invention was manufactured is illustrated by dashed lines for comparison purposes. It has a height d. The first, lower end side 52 in FIG. 1a, is planar.

FIG. 1a shows that the thrust ring 1 has cross sections which differ in the circumferential direction. For the thrust ring 1 to fulfill its role, it is machined, on its surface 3 on the second upper end side 51 in FIG. 1a, which forms the running surface 2, such that the running surface 2, under load from the axial bearing, always bears against the rolling elements with surface-to-surface contact. For this purpose, the thrust ring 1 has, with respect to a first line of symmetry $S_D$ extending through the theoretical center point and axis M, two surface regions 4 and 5 which are arranged and machined symmetrically with respect to one another. These regions 4 and 5 are arranged symmetrically with respect to one another and are designed identically in these regions with respect to the cross section of the thrust ring 1. The regions 4 and 5 extend in the circumferential direction of the thrust ring 1. These regions are preferably arranged at a specific distance c from the line of symmetry $S_D$, although theoretically it is also possible for the machining to be performed right from the line of symmetry $S_D$. If, in the unmachined state as illustrated as an annular basic body 50 by the dashed line in FIG. 1a, the thrust ring 1 has a cross section which is uniform over its entire circumference, the change in cross section in the circumferential direction in the machined surface regions 4 and 5 is such that this change varies at least in the circumferential direction. The thrust ring 1, starting from the axis of symmetry $S_D$ in the circumferential direction, preferably undergoes machining which produces the maximum change in cross section in the regions 4 and 5 in the region of the second axis of symmetry $S_{DS}$, which runs at right angles to the first axis of symmetry $S_D$. This means that in the circumferential direction, when the thrust ring is viewed from above, the amount of material removed is generally lowest in the region of the axis of symmetry $S_D$, increases in the circumferential direction and is at its highest in the region of the line $S_{SD}$ running perpendicular to the axis of symmetry $S_D$. Furthermore, the two surface regions 4 and 5 are characterized in that the change in cross section increases from the region of the inner circumference 6 toward the outer circumference 7 of the thrust ring 1, i.e. the dimensions which characterize the cross section in the height direction, i.e. the thickness dimensions, are greater in the region of the inner circumference than in the region of the outer circumference 7. FIGS. 1b and 1c use different measurement locations in the individual machined surface regions 4 and 5 in accordance with the matrix shown, to illustrate, by way of example, the change in cross section in the circumferential direction. The amount of material removed in the region of the inner circumference 6 is denoted by a, and the amount of material removed in the region of the outer circumference is denoted by b. It can be seen from FIG. 1c that the greatest change in cross section takes place at the two measurement regions, i.e. in the region of the inner circumference 6 and of the outer circumference 7, which lie in the region of the line $S_{SD}$ which is perpendicular to the axis of symmetry $S_D$. In the circumferential direction toward the axis of symmetry, the cross-sectional area of the thrust ring 1, which is also denoted by 8, increases, and in particular the dimensions of the thrust ring 1 increase in the vertical direction, i.e. its thickness in the region of the inner circumference 6, which is characterized by the material abrasion coefficient a with respect to the state on the base body 50 and is described by the material abrasion coefficient b in the region of the outer circumference 7, increases. The change in cross section does not necessarily have to take place through the change in the dimension in the height direction at the inner circumference 6 and at the outer circumference 7, but rather may take place only in a region between these two circumferences. In this context, FIG. 1b illustrates the arrangement of different measurement locations I to V in the region 4, the measurement location V being arranged on the axis of symmetry $S_D$ of the thrust ring 1, while the measurement location I is arranged on the line $S_{SD}$ which is perpendicular to the axis of symmetry $S_D$. By way of example, for the thrust ring 1, a matrix is used to give characteristic values for the amount of material abraded from the surface 3 of the thrust ring 1 at the individual measurement points in the region of the inner circumference 6 and in the region of the outer circumference 7. These measurement points are in each case denoted by $I_a$ to $V_a$ for the inner circumference 6 and $I_b$ to $V_b$ for the outer circumference 7 of the thrust ring 1. The matrix illustrates the amount of material which has been removed starting from the basic state of the thrust ring 1, i.e. in the unmachined state, at the corresponding measurement locations $I_I$ to $V_I$ and $I_{II}$ to $V_{II}$. For a smaller or larger axial bearing and the associated thrust ring, the amount of material removed, given approximately identical proportions, is correspondingly smaller or larger.

FIGS. 2a and 2b use two views to illustrate the basic principle of the method according to the invention for producing the thrust ring 1 from an annular basic element 50 with at least one planar end face 52. In this case, an element 53 of predefined height h, which extends along an axis which can run through the center point and extends in each case in the radial direction, in particular the second axis of symmetry $S_{SD}$, is laid under the annular base element 50 in the region of this axis of symmetry, against the planar end face 52, for underfilling purposes, this element being supported against a base surface 54. In the region of the further axis of symmetry $S_D$, which is oriented perpendicular to the axis of symmetry at which the underfitting takes place and which likewise extends through the center point M, the annular basic element 50 is secured with respect to the base surface 54 or a surface which is arranged at a lower height, in the vertical direction, than the base surface 54. The securing is in this case effected by means of screw connections 55.1 and 55.2. The material is removed from the surface of the second end face 51, so as to produce a change in cross section, by means of a grinding means which, in terms of its grinding edge, is arranged parallel to the base surface 54 or the other surface and above the underfitted planar end face 52.

FIG. 3a shows a diagrammatically simplified illustration, on the basis of an axial section through a cardan joint arrangement 9, so as to illustrate the integration of the thrust ring which has been designed in accordance with the invention, in this case the thrust rings 1.31 and 1.32, in an axial bearing arrangement 21.1 and 21.2, respectively. For this purpose, the cardan joint arrangement 9 comprises a universal joint 11 which is mounted, by means of its bolts 12 and 13, in an articulated yoke 10, comprising two articulated-yoke halves—a first articulated-yoke half 14.1 and a second articulated-yoke half 14.2—in the regions of its blind bearing bores 15, in this case 15.1 and 15.2, respectively, by means of in each case one bearing arrangement 16, in this case 16.1 and 16.2. The bolts of the universal joint 11, which are arranged offset by 90° with respect to the bolts 12 and 13 mounted in the articulated yoke 10, are mounted in a further articulated yoke, which is not shown in detail here and likewise comprises two articulated-yoke halves, in the region of its bearing bores, by means of in each case one bearing arrangement. The articulated yoke is in this case coupled, for example, to a machine part (not shown in the drawing) of the drive side, and the articulated yoke which is not shown, for the other bolts of the universal joint 11, is coupled to a machine part on the output side. The bolt axes Z1 and Z2 of the universal joint 11, which are understood as meaning the axis running through the bolts 12 and 13 and through the two bolts which run perpendicular to these bolts but are not shown here, may, as illustrated, be arranged in one plane or may be arranged in two planes which are offset but parallel to one another. The bearing arrangement 16.1 or 16.2 for the bolts 12 and 13 comprises a radial bearing 17, denoted by 17.1 for the bolt 12 and by 17.2 for the bolt 13. The radial bearing 17.1 or 17.2 in each case comprises an outer ring 18.1 or 18.2, respectively, and rolling elements 19.1 and 19.2. The inner running surface 20.1 and 20.2, respectively, is formed by the outer circumference of the bolts 12 and 13, respectively. Furthermore, the bearing arrangement 16.1 or 16.2, respectively, comprises an axial bearing 21.1 or 21.2, respectively, which is arranged in the region of the root 22.1 of the bolt 12 or 22.2 of the bolt 13, respectively. The axial bearing 21.1 or 21.2 comprises at least two rolling elements 23.1 or 23.2, respectively. The rolling elements 23.1 or 23.2 are supported on an element, here illustrated as an end face 24.1 or 24.2, respectively, which is directed toward joint axis G, which is to be understood as meaning the axis running through the intersection of the bolt axes Z1 and Z2 laid in a plane, of the outer ring 18.1 or 18.2, respectively, of the radial bearings 17.1 or 17.2, respectively. In this case, that end face 24.1 or 24.2 of the outer ring 18.1 or 18.2, respectively, of the radial bearing 17.1 or 17.2, respectively, which is directed toward the joint axis G forms the outer running surface 25.1 or 25.2, respectively, for the rolling elements 23.1 or 23.2, respectively, of the axial bearing. When viewed from the joint axis G toward the end face 27.1 of the bolt 12 and the end face 27.2 of the bolt 13, the inner running surface 26.1 or 26.2 is formed by the thrust ring 1.31 or 1.32, respectively, in particular the region which forms the running face 2.1 or 2.2, respectively. In this case, the thrust ring 1.31 or 1.32 is fitted, in the fitted position, in such a manner—not shown here however—that the regions from which the greatest amount of material is removed, i.e. the regions 4 and the regions 5, are in each case arranged in the circumferential direction of the universal joint 11. For this purpose, to facilitate fitting and to avoid movement in the circumferential direction, it is possible to provide a suitable stop 28 either on the thrust ring 1, which interacts with a corresponding recess on the articulated yoke 14.1, or on the articulated yoke, in which case a corresponding, complementary recess would need to be provided on the thrust ring 1.31 or 1.32. This stop may be formed integrally with the thrust ring or may be formed by at least one separate element, in the case illustrated a row of pins 28 which fix the position of the thrust ring 1.31 with respect to the bolt 12 in the circumferential direction and, at the same time, function as attachment means. Preferably, however, the first variant is selected, i.e. a corresponding stop is provided on the thrust ring 1, which may be designed, for example, in the form of a projection. On the other hand, when fitting the axial bearing 21.1 or 21.2, it is necessary to pay particular attention to the orientation of the regions 4 and 5. In the case illustrated, the thrust ring 1 is fitted in such a manner that the axis of symmetry $S_D$ lies in a plane which can be described by the joint axis and the bolt axes Z1 and Z2. The line $S_{DS}$ which is perpendicular to the axis of symmetry $S_D$ of the thrust ring 1 runs perpendicular to the plane described by the joint axis G and the bolt axes Z1 and Z2.

In the bearing arrangement illustrated, the axial forces which are generated through the transverse acceleration and act in the direction of the bolt axis Z1 away from the joint axis G, in this case, for example, in the direction of the articulated-yoke half 14.2, will lead to a load on the axial bearing 21.2 which lies in this direction and to a load on the axial bearing 21.1 which, in the bolt axis direction, lies opposite to the direction in which the axial forces act, on the side of the articulated-yoke half 14.1, being relieved. The bearing from which the load has been relieved can in this operating state be referred to as the passive bearing, while the bearing which is under load can be referred to as the active bearing. In this embodiment, an axial force which acts in the direction of the bolt axis Z1 toward the second articulated-yoke half 14.2 away from the joint axis G causes an axial movement of the outer ring 18.2 of the radial bearing 17.2, with the result that the load on the axial bearing 21.1 is relieved. No force is transmitted via this axial bearing 21.1. On the articulated-yoke half 14.2, the outer ring 18.2 of the radial bearing 17.2 is subjected to a compressive load. The axial force is then supported, via the outer collar of the radial bearing 17.2, which is under compressive load, on the articulated-yoke half 14.2.

In the circumferential direction of the force, the deformation of the torque-transmitting components of a cardan joint 9 is so extreme that the load distribution in the bearing arrangement may lack uniformity so that only a fraction of the possible load-bearing capacity is utilized. The absence of plane parallelism of the axial bearing races generally causes premature fatigue of the races and rolling bodies and/or plastic deformation with its attendant consequences (pitting). On the other hand, the assured dynamic and static load-bearing coefficients of the bearings are only guaranteed by the bearing manufacturer in a rigid bearing connection structure. To ensure the plane parallelism of the races of the axial bearing 25.1 and 26.1 or 25.2 and 26.2 when a circumferential force is also active, the thrust ring which has been designed in accordance with the invention and, in the case illustrated, forms the inner running surface 26.1 or 26.2 is integrated in such a manner that, under load, a plurality of rolling elements always bear with linear contact against that surface 3.1 or 3.2 of the thrust ring 1.31 or 1.32, respectively, which forms the inner running surface 26.1 or 26.2, respectively, i.e. a number of rolling bodies produce contact between two races over the shortest possible distance.

FIG. 3b shows a diagrammatically simplified illustration presenting the basic structure of a cardan joint arrangement 30, without illustrating the radial guide elements, comprising a universal joint 31, the bolts 32 and 33 of which are mounted in an articulated yoke 34. The bearing arrangement 35 for a bolt which is required for this purpose comprises a radial bearing 36 and an axial bearing 37. The universal joint 31 is supported, by means of the bolts 32 and 33, in the articulated yoke 34 in the region of its bearing bores 38. Via the bearing bore 38, the support is effected at least indirectly against the articulated yoke 34. The radial bearing 36 in this case comprises an outer ring 39 and rolling elements 40. The inner running surface 41 may be formed by a separate inner ring or, as illustrated, by the outer circumference of the bolts 32 and 33. The axial bearing 37 is arranged in the region of that end face 42 of the bolt 32 which faces away from the joint axis G. Although this is not illustrated here, the axial bearing 37 may be arranged in a blind bolt bore arranged in the region of the end face 42 of the bolt 32 or may be arranged directly on the end face 42. In the first case, the bolt bore 43 would preferably extend from in each case the end side 42 toward the bolt axis Z1 and would have an axis of symmetry which coincides with the bolt axis Z1. The axial bearing 37 comprises the rolling elements 44 which are supported in each case on an end face 43, which is directed toward the joint axis G, which is to be understood as meaning the axis through the intersection of the bolt axes of the universal joint laid in a plane, of the thrust ring 1 and an element shown either as a further end face, which is formed either by the end face 42 of the bolt 32 or a separate element arranged between rolling elements 44 and end face 42 of the bolt 32. A first, inner running surface 45 for the rolling elements 44 of the axial bearing 37 is formed, for example, by the end face 42 of the bolt 32, while the second, outer ring surface 47 is formed by the thrust ring 1, which, by way of example, comes to bear against the inner surface 46 of the bearing bore 38, which is in the form of a blind bore, in the articulated yoke 34.

Figure 4A:
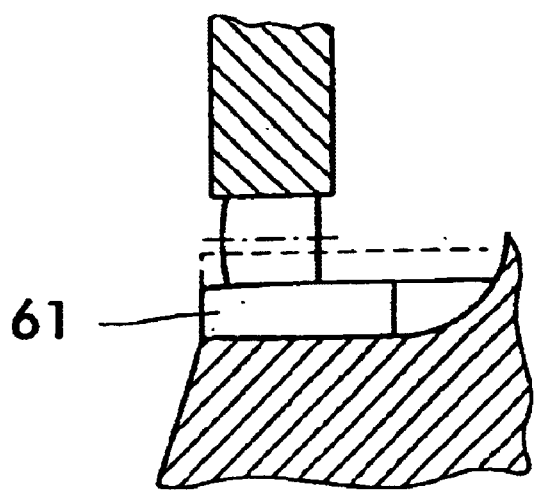
FIGS. 4a and 4b are respectively comparative illustrations of play adjustment which occurs for an arrangement of a thrust ring in an axial bearing that is arranged in the region of the bolt root of a universal coupling under load and showing problems which arise with a conventional embodiment.
Figure 4B:
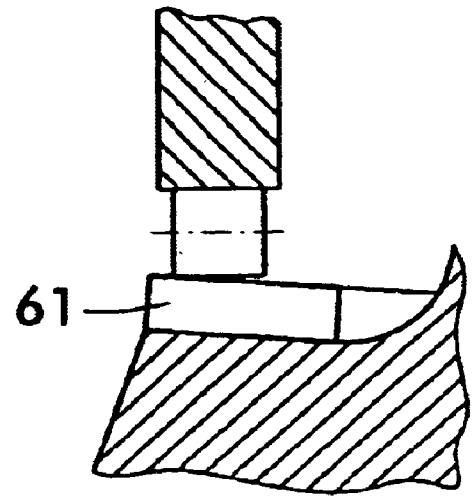

FIGS. 4a and 4b provide highly diagrammatic illustrations, on a comparative basis, of the effects of the circumferential force on the position of the axial bearing races of a solution as shown in FIG. 2 and a conventional solution without a thrust ring according to the invention where FIGS. 4a and 4b show use of a thrust ring 61 of the prior art in two load conditions and show effects of not using the invention.

What is claimed is:

1. A thrust ring for an axial bearing for forming a running surface for rolling elements;
   the thrust ring having a first end side and a second end side and an inner circumference and an outer circumference; the ring having a central axis, a first axis of symmetry extending across the ring and through the central axis and having a second axis of symmetry at right angles to the first axis of symmetry and extending through the central axis of the ring;
   the second end side of the ring having first and second surface regions which are symmetrically at opposite sides of the first axis of symmetry and which regions extend to the second axis of symmetry;
   each of the first and second surface regions being configured to define a varying cross-section of the thrust ring in a circumferential direction of the thrust ring so that the thrust ring cross-section has a first cross-sectional size at the first axis of symmetry and a smaller cross-sectional size at the second axis of symmetry, the cross-section being configured to change by reductions in thickness dimensions of the thrust ring in a region of the inner circumference and outer circumference whereby in the first and second surface regions of the second end side the thickness dimensions in a region of the inner circumference differ from one another in the circumferential direction towards the second axis of symmetry and the thickness dimensions in a region of the outer circumference differ from one another in the circumferential direction towards the second axis of symmetry.

2. The thrust ring of claim 1, wherein the first and second surface regions begin at a location spaced circumferentially from the first axis of symmetry.

3. The thrust ring of claim 2, wherein at the first axis of symmetry the cross-section area of the ring comprises the inner circumference and the outer circumference of the ring having identical thickness dimensions.

4. The thrust ring of claim 1, wherein the differences in the thickness dimension are directly at the inner circumference and at the outer circumference of the thrust ring.

5. The thrust ring of claim 1, wherein at the first axis of symmetry the cross-section of the ring comprises the inner circumference and the outer circumference of the ring having identical thickness dimensions.

6. The thrust ring of claim 1, wherein the change in thickness dimensions of the ring toward the circumferences thereof with respect to the thickness dimension at the first axis of symmetry is in a range of tenths of a millimeter.

7. The thrust ring of claim 6, wherein the change in the thickness dimension of the thrust ring at the inner circumference, between the first axis of symmetry and the second axis of symmetry is between 0 mm and 0.68 mm and at the outer circumference is between 0 mm and 0.8 mm.

8. The thrust ring of claim 7, wherein the ring is comprised of a material having an elasticity in the range of 180,000 N/mm$^2$ to 230,00 N/mm$^2$.

9. The thrust ring of claim 8, wherein the ring consists of heat treated steel.

10. The thrust ring of claim 9, wherein the ring consists of case hardened steel.

11. The thrust ring of claim 1, wherein the first end side of the thrust ring is a planar inside.

12. In combination, the thrust ring of claim 1 and an axial bearing having a fitted position for receiving the machined first and second surface regions of the thrust ring;

at least one projection from the ring and a respective recess provided in the bearing for receiving the projection from the ring and for positioning the machined surface regions in the axial bearing.

13. In combination, the thrust ring of claim 1 and an axial bearing having a fitted position for receiving the machined first and second surface regions of the thrust ring;

a recess in the thrust ring and a projection from the bearing at the thrust ring for being received in the recess of the thrust ring when the thrust ring is received in the bearing for positioning the machined surface regions in the axial bearing.

* * * * *